May 7, 1946. B. C. ROEHRL 2,400,024
FILM SPOOL
Filed Dec. 20, 1944 4 Sheets-Sheet 1
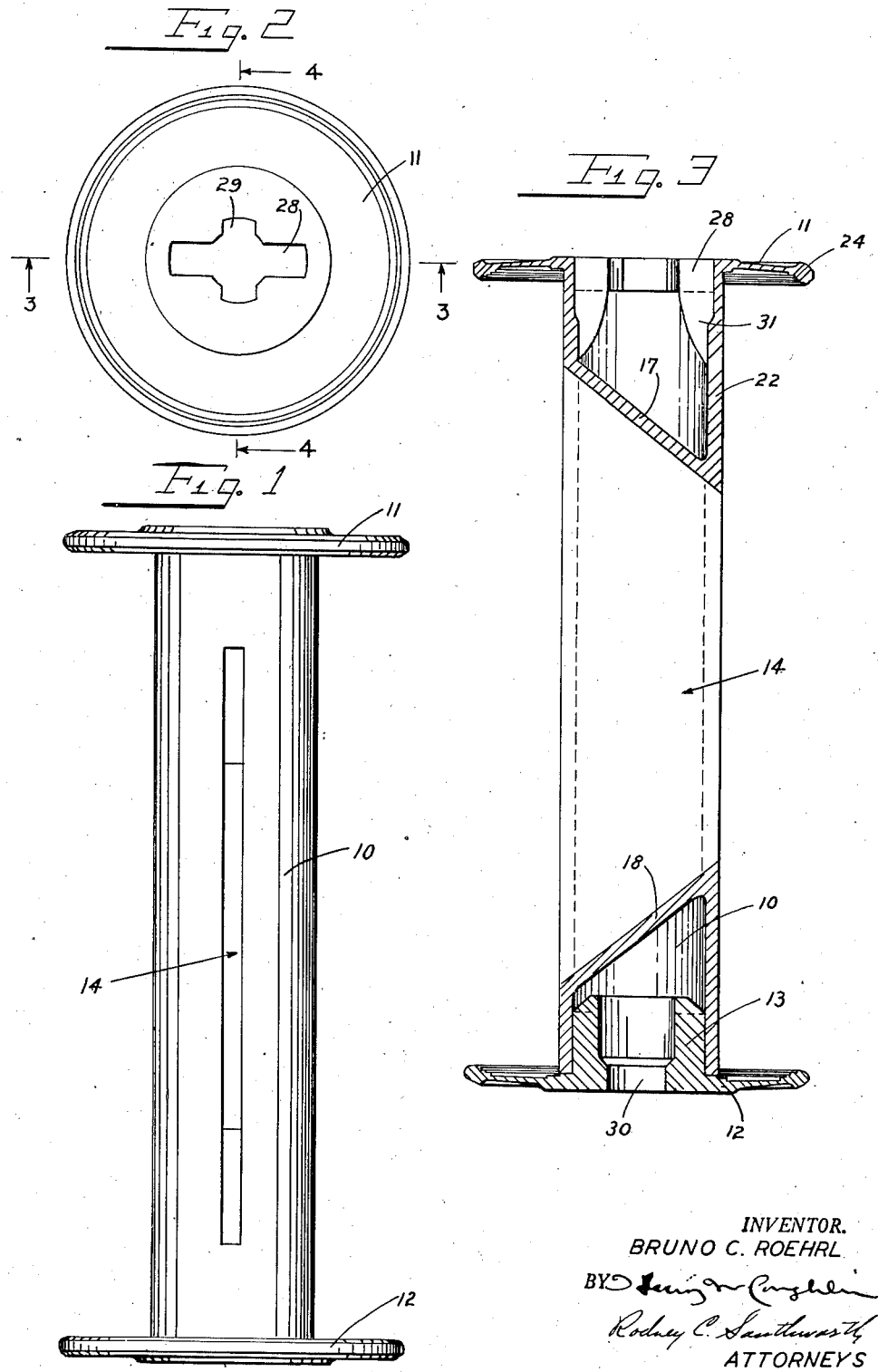
INVENTOR.
BRUNO C. ROEHRL
ATTORNEYS May 7, 1946.　　　B. C. ROEHRL　　　2,400,024
FILM SPOOL
Filed Dec. 20, 1944　　　4 Sheets-Sheet 2
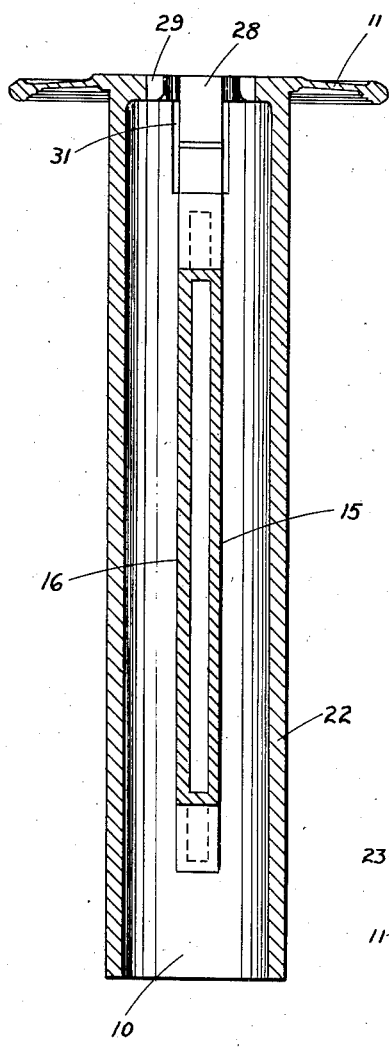
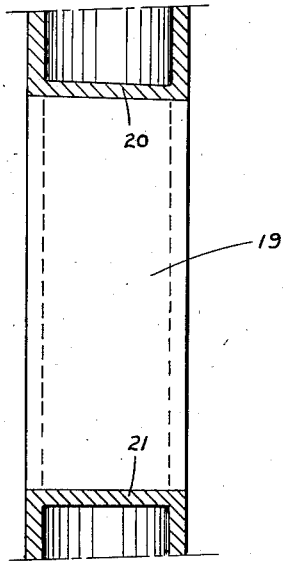
INVENTOR.
BRUNO C. ROEHRL
ATTORNEYS May 7, 1946.   B. C. ROEHRL   2,400,024
FILM SPOOL
Filed Dec. 20, 1944   4 Sheets-Sheet 3
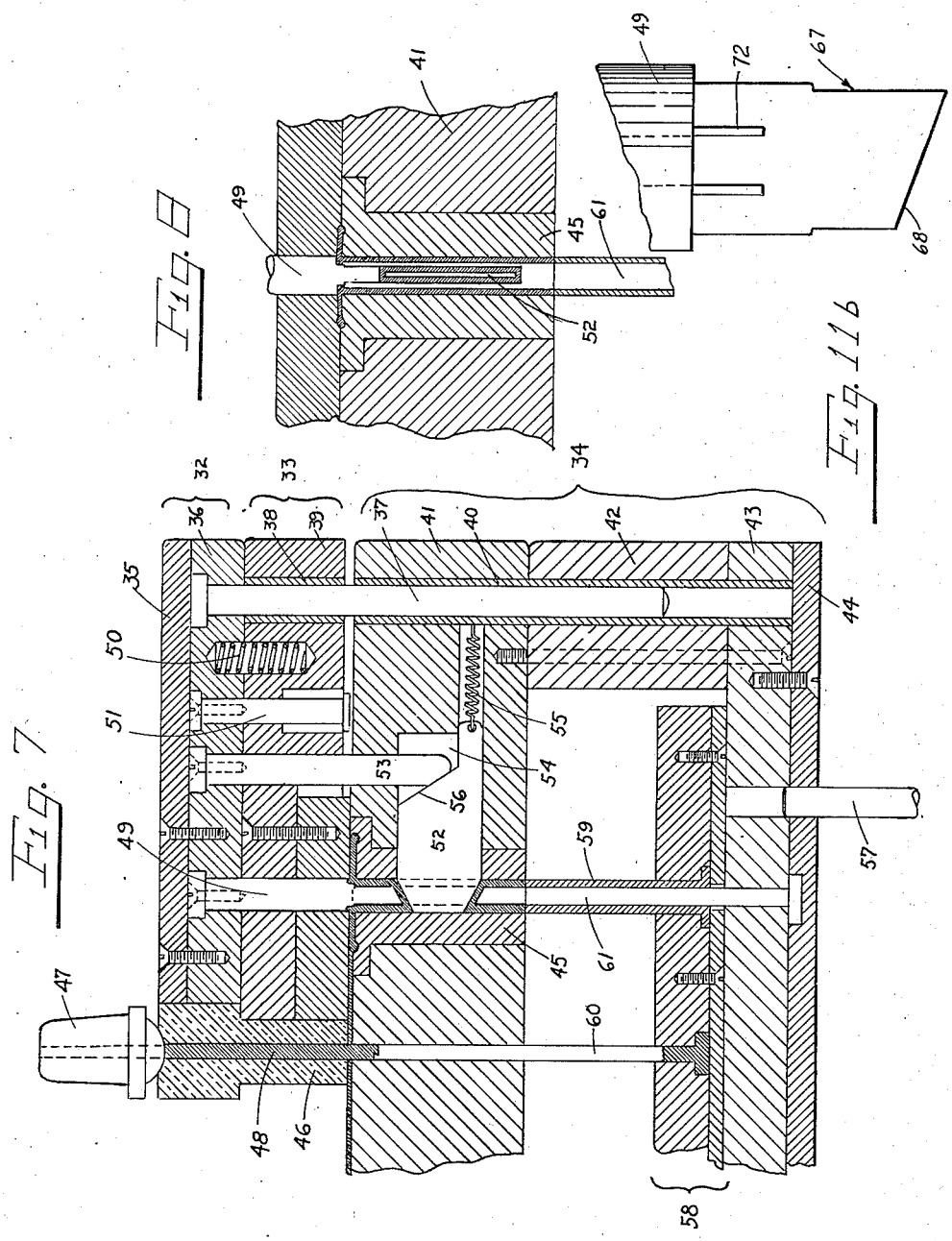
INVENTOR.
BRUNO C. ROEHRL
ATTORNEYS May 7, 1946.　　　B. C. ROEHRL　　　2,400,024
FILM SPOOL
Filed Dec. 20, 1944　　　4 Sheets-Sheet 4
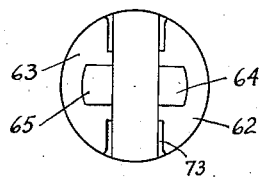
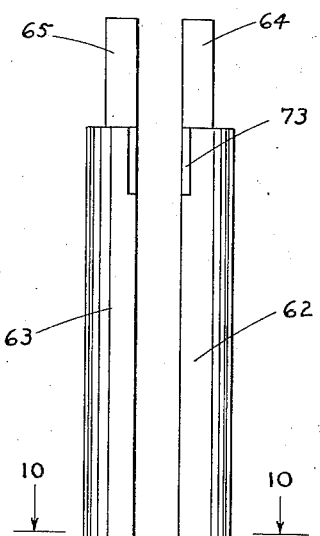
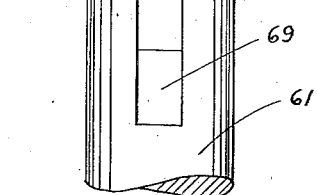
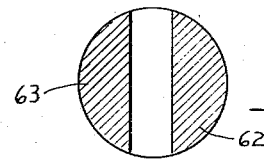
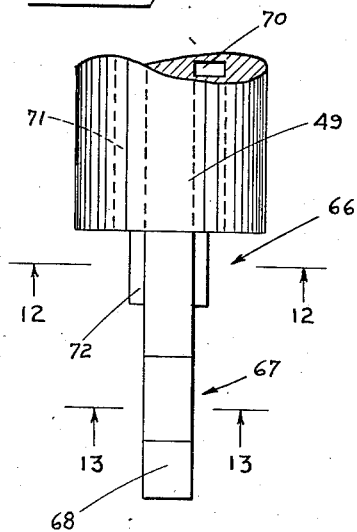
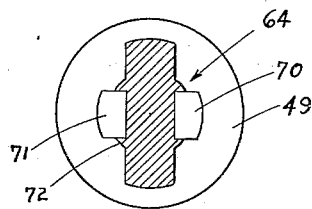
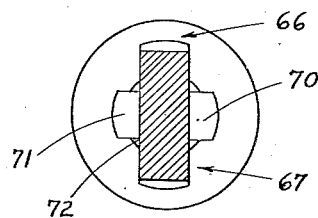
INVENTOR.
BRUNO C. ROEHRL
ATTORNEYS Patented May 7, 1946

2,400,024

UNITED STATES PATENT OFFICE 2,400,024

FILM SPOOL

Bruno C. Roehrl, Binghamton, N. Y., assignor to General Aniline & Film Corporation, New York, N. Y., a corporation of Delaware Application December 20, 1944, Serial No. 568,945

17 Claims. (Cl. 242—71)

This application pertains to a film spool, and more specifically, to a film spool molded from plastic material. The application is a continuation-in-part of my co-pending application Serial No. 474,398, filed February 1, 1943.

Among the objects of the invention is that of so molding a plastic film spool that there shall be no flash or parting lines running lengthwise of the spool core, nor shall there be any such lines at the inner faces of the end flanges. It is a purpose of the invention to so mold the spool that it is formed in two parts which are later assembled into a unitary structure. All parting lines on either of the spool elements are so formed as to run circumferentially of the flanges and are not in a position to be contacted by either the film or the backing paper when on the spool, or during the process of winding them on the spool.

It is another object of the invention to form a hollow spool which shall be relatively light in weight, shall be extremely accurate as to its dimensions to fit camera mechanisms, and to be easily inserted in or taken out of all cameras, thereby facilitating its use. It is also an object of the invention to form the film slot as an integral part of the spool, and so form that slot that it shall be entirely light tight and, in spools which are hollow, shall serve as a reinforcing element. All parts of the spool are of relatively thin section, but the method of molding and the construction of the spool are such that the section thickness is relatively uniform, thereby preventing distortion of the molded parts and making it unlikely that there shall be any undue internal stresses set up during the molding operation which might later lead to failure of certain of the spool elements.

It is another object of the invention to form the end flanges of the film spool so that they are dished and have ridges adjacent their peripheries which serve to compress the backing paper layers which are outermost, thereby to form a light lock, and also to prevent accidental unwinding of the film or backing paper. This last-mentioned detail is incorporated in the molded spool by especially forming it in the manner above mentioned and by the method of molding in two parts and withdrawing the parts from the mold in such a manner that parting lines run circumferentially of the flanges rather than lengthwise of the spool cores and outwardly at the flange faces.

Other objects of the invention will become apparent as the disclosure proceeds and as the detailed construction of the spool and the method of molding it are described.

In bringing about the above-mentioned desired results, a film spool is molded from plastic material, the core and a single integral flange being formed in one molding operation, while the opposite flange and an extension for connection to the core are molded in a separate operation or separate mold cavities. The two parts are fitted together and are permanently connected in any one of several different manners. As an alternative, both flanges may be formed separately, and the spool then completed by assembling those flanges to a separately molded core. In the following part of the disclosure, the invention will be described in detail by reference to the accompanying figures of drawings in which:

Fig. 1 is an elevation of a film spool constructed in accordance with the invention.

Fig. 2 is an end view of that film spool.

Fig. 3 is a section taken through the spool of Figs. 1 and 2, the section being taken along the center line of the spool and in a plane parallel to that of the slot, line 3—3.

Fig. 4 is a section of the spool shown in Figs. 1, 2 and 3, but having the separately cast end flange removed, the section being one at right angles to that of Fig. 3, line 4—4.

Fig. 5 is a fragmentary section of a spool in which the slot has approximately parallel rather than tapering ends.

Fig. 6 is a section, greatly enlarged, showing the manner in which a film and backing paper are wound on the spool and the light lock as applied to the outermost layers of paper.

Fig. 7 is a section showing part of a molding machine in which the core and integral flange of the spool are molded.

Fig. 8 is a section showing a part of the molding device of Fig. 7, but illustrating the mold and plastic material enclosed therein as they appear when the section is taken at right angles to that of section 7.

Fig. 9 is a view of part of the molding means which forms the hollow core of the spool, also the film slot.

Fig. 10 is a section taken on line 10—10 of Fig. 9.

Fig. 10b is an end view of Fig. 9.

Fig. 11 is a detail of that part of the molding machine which forms the key slot at that end of the spool.

Fig. 11b is a view of what is shown in Fig. 11, but as seen from the side.

Fig. 12 is a section taken at line 12—12, Fig. 11.

Fig. 13 is a section taken at line 13—13, Fig. 11.

Now referring to Figs. 1, 2, 3 and 4, the molded plastic film spool comprises a core 10, an integral flange 11, and a separately formed flange 12, which is assembled by inserting the projecting hub 13 into the end of the core. Preferably, the core is hollow, although in spools having an extremely small core diameter, it may be solid except for the film slot, key slot, and that opening at the end in which the hub of the separately molded flange is to be inserted. In the event the core is hollow, the film slot generally indicated by numeral 14, is molded integrally with the core and in such a manner as to be light tight. That is, there is no possibility of light entering through the ends of the hollow core and fogging the film by passing through the slot at the layers of film adjacent the core, that being something possible with many spools, especially where film is wound on the spool without a protecting or backing paper strip. The film slot is bounded by parallel sides 15 and 16, Fig. 4, and the end walls 17 and 18. The sides of the slot and the walls 17 and 18 serve to reinforce the core, thereby making it possible to mold the spool with a relatively thin wall section, and thus reduce its weight. That is very important when making spools of larger size.

In that form of spool illustrated in Figs. 1–4, the conventional type of slot is shown. The tapered ends of the slot are formed at such an angle as to accommodate the tapering ends of a film, backing paper, or leader strips. However, in most spools, it is essential that the film slot have angular ends since it is generally produced by cutting with a saw in the event the film core is of wood, while in the case of metal spools in which the film slot is not continuous from one side to the other, one of the slots is relatively wide and short, thereby making it essential to insert the tapered end of the material at the thinner slot to make certain that it enters the much wider slot at the other side. Here a decided advantage is obtained in that relatively parallel ends may be formed in a slot so that in spooling the material at the factory, or when threading a new film in a camera, there is no necessity of determining into which side of the slot the material is to be introduced. In Fig. 5, a modified form of slot 19 has relatively parallel ends 20 and 21, the only tapering necessary being that for withdrawing part of the mold by which the slot is produced. A spool thus formed is highly advantageous since, during the spooling operation, it is not necessary to position the spool in any particular manner since the film, paper or leader strip may be inserted at either side; the same also applies when threading in a camera.

The end flanges of the spool are specially formed as shown in the greatly enlarged section, Fig. 6. The core 10 has a wall or shell 22 from which extends the flange 11. Here the integrally cast flange is illustrated, although it is to be understood that both flanges are identical in this respect. A description of one applies equally to the other. That flange is so shaped as to be dished or curved inwardly at its inner face 23 and has a plurality of shoulders or ridges indicated by numeral 24, said shoulders or ridges being adjacent the outer periphery 25 of the flange, and, in fact, being in such a position that when all layers of material intended to be spooled on the core have been wound thereon, the last two or three layers will engage those ridges. The ridges are preferably concentric although, as a matter of theory, they might more preferably be spiral. However, that is a refinement which is not essential since the concentric ridges serve practically as well. It is to be noted that the base of the flange is of such width, or the distance between the flanges when the spool is assembled is such, that the film or paper width practically equals that distance. Then the flange recedes from the ends of the spooled material, first tapering outwardly and then inwardly to the ridges or shoulders, the last two or three of those ridges being so positioned that the distance from a ridge at one flange to the corresponding ridge at the opposite flange is slightly less than the actual width of material to be spooled. That makes it necessary to force the last two or three layers of the material into position, as shown in Fig. 6, compressing the material and establishing a light lock by the tight engagement of that material within the said ridges or concentric shoulders.

In this particular illustration, film indicated at 26 is protected by a backing strip 27 of paper such as is commonly employed in roll film for most cameras. Of course, film may be wound directly on the core of the spool and may be locked in position by engagement with the concentric ridges. As a matter of fact the end of the spooled material may be withdrawn from beneath the outermost ridge only by exerting a slight force, that is, a force which is not great enough to hinder advancement of the film in the camera but which is sufficient to prevent unintentional release of the film from the spool during insertion of the same in a camera or while the film is being handled after removing the protecting wrapper from it. As a matter of fact, actual experiments have shown that without a protecting wrapper, film wound on the spool as herein illustrated may be kept in a lighted room for an extended period of time without danger of fogging. If a film such as 35 mm. film for miniature cameras, is wound on the spool, leader strips are generally employed, and the effect is pretty much the same as that of Fig. 6 except that there are no separating layers of paper throughout the intermediate bulk of the material held on the spool. It is not necessary to employ a leader strip at the core of the film since there is no danger of fogging through the film slot, yet the leader at the opposite end of the film may serve very effectively as a light lock and for holding the film in its position on the spool even though no other restraining influence is employed.

The key slot comprises two longer slots indicated by numeral 28 and shorter slots 29. They extend at either side of a circular, central opening, and this slot is adapted to fit all standard type cameras. At the other end, the hole 30 is of standard size and is merely a bearing for the pivot about which the spool may rotate at the opposite end from the key slot.

The elongated slots 28 have parallel sides or fins which extend down into the hollow core of the spool as shown at 31, Figs. 3 and 4. Those are formed as the plastic material tends to fill in between two parts of the mold later to be described.

The separate flange and its hub 13 are centered within the open end of the core 10. The length of the core is such as to allow that flange to be pushed against the end of the core and, thereby establish the proper distance between the inner parts of the flanges, as above described and as illustrated in Fig. 6. If desired, the separate cast flange may be assembled by inserting the core and integral flange in an assembling jig and employing a stop against which all flanges may be pushed in the assembling operation. That is necessary only if extreme tolerances are to be maintained. The fit of the parts may be such that hub 13 will be retained within the core 10 without more than frictional engagement. However, it is preferred to employ a solvent which will unite the plastic material of the core and that of hub, thereby forming a unitary structure. If the plastic material is of a type to be thermoplastically united, then heat may be applied. An adhesive may be used, but if so, it is preferable that one be employed which will not be affected by developing solutions, fixers, or other chemicals used in photographic processes since a plastic spool of this type is adapted to be used more than once, and it should not be necessary to do more than wash the spools in hot water preparatory to again winding film on them. Repeated use is something which cannot safely be done with metal spools or those made of wood and metal. Wooden spools cannot safely be used a second time due to the fact that they may have become saturated with hypo or other solution harmful to the film. Metal, or wood and metal, spools are also discarded after the first use because they are always subject to rusting, especially, after contact with various solutions employed in the dark room or after washing preparatory to being used a second time. After a period of time they tend to rust anyway.

Now referring to Fig. 7, part of a molding machine adapted to mold the combined core and flange has been illustrated. This is an injection type machine and comprises a stationary plate, spring pressure plate, and movable plate sections. The stationary plate includes the part within the brace 32. The spring pressure plate is opposite the brace 33, and the movable plate includes those elements extending vertically throughout a height determined by brace 34. The stationary plate includes the top element 35 and the next lower element 36. They are connected together by a suitable connecting means, and a series of pins 37 retained at their upper ends within the stationary plate section serve to guide or position the other elements beneath that plate. Each pin 37 is a sliding fit within a bushing 38 in the spring pressure plate section 39 and a second bushing 40 which extends downwardly through a mold or cavity retainer 41, a spacer 42 and a lower supporting plate 43. Beneath that is a lowermost member 44 similar to the top member 35.

There are a plurality of cavities or molds 45 which are carried concentrically or in parallel tiers about a central sprue 46 which receives the plastic molding compound as fed through a nozzle 47. The mold is thus adapted to cast a number of spool parts at a single operation. It may be circular in form or rectangular in form so that there are a plurality of guiding pins 37 conveniently arranged so as to guide and position the spring pressure plate and movable plate as the same are reciprocated vertically at appropriate times during the molding operation for withdrawing the mold parts and for ejecting the completed core and flange at each cavity.

As the plastic material 48 enters through the sprue 46, it is injected laterally along the upper surface of the cavity holder 41 and enters the mold itself at the outer edge or periphery of the flange. Of course, that will leave a gate projecting from the flange which may be broken off or cut, and the rough edge may be smoothed by grinding or otherwise abrading the surface as is necessary.

The stationary plate carries a key pin 49 which extends downwardly through the spring pressure plate and into the mold cavity as illustrated in Figs. 7 and 8. That key pin is also illustrated in detail in Figs. 11–13, and its particular shape and the relationship thereof to the finished spool will be described in a later paragraph. The spring pressure plate 39 is adapted to move away from the stationary plate 32 throughout a limited extent after the mold cavities have been filled and after the plastic has hardened. The motion is brought about as a result of spring pressure developed by a plurality of compression springs 50, and the limit of that motion depends upon stops 51 and the depth of the counterbores within which the heads of the stops 51 engage. The movement of both the spring pressure plate and the movable plate takes place in accordance with movement of certain controlling elements (not shown), and both move as a unit until the spring pressure plate reaches the end of its travel. That travel is sufficient to withdraw the key pins 49 which, as before stated, are attached to the fixed or stationary plate.

The next part of the mold to be discussed is the slide 52 which is sometimes referred to as a "sword." That slide 52 has a tapered end adapted to form the key slot in the event the slot is shaped as in Fig. 3, otherwise the end will taper only so much as is necessary to assure easy withdrawal from the molded part if the construction of Fig. 5 is to be adhered to. A cam 53 is also fixed as a depending part of stationary plate 36 and projects down through the spring pressure plate and into the slot 54 within which slide 52 is adapted to work. A spring 55 always tends to withdraw the slide except as it is forced into position by the edge of the cam 53 working against an incline 56 on the slide itself. In the position shown in Fig. 7, the slide or sword has been pushed inwardly against the edge of the cavity, and as the plastic material is forced into the cavity, it flows around the tapering or other end of that slide, thereby forming the slot 14 or 19 as the case may be.

The movement imparted to the spring pressure plate and movable section 34 withdraws cam 53 from engagement with slide 52 and the spring, therefore, pulls the slide out of the film slot. Both the withdrawal of the key pin and the slide occur by the time the spring pressure plate has reached its extent of travel. Further movement of the movable section 34 will cause the molded part to be ejected from the cavity. As the mold is opened, the locking pin enters and closes off the sprue and stops the flow of plastic. By the time the spring pressure plate reaches the end of its travel the ejector rod 57 will have taken up the slack between its top surface and the ejector plate 58. That then prevents any further movement of the ejector plate and any of its attached parts. Those parts include a plurality of ejector sleeves 59 and a sprue locking pin 60.

The remainder of the hollow core in the molded part is formed by a mold fork 61 retained at its extreme end by the movable plate, but extending through the ejector sleeve 59 in the direction of the stationary plate 32 and into cooperation with the cavity forming portion of the key pin 49. That mold fork is shown in detail in Figs. 9, 10 and 10b. After the limit of travel for the spring pressure plate has been reached, further movement of the movable plate, after the ejector plate becomes stationary, results in pushing the molded piece from the cavity. Incidentally, it simultaneously pushes that piece from the end of the mold fork. The extent of travel for the movable plate is sufficient to clear entirely the molded pieces from their cavities, whereupon they can be removed and the cycle again repeated.

Now referring to Figs. 8–13, certain details of the molding devices and of the manner in which they are employed will be described. In Figs. 9, 10 and 10b, the mold fork 61 is shown greatly enlarged. That fork is employed to make the hollow core and determines the outer surfaces of the film slot and reinforcing member. It has the two ends 62 and 63 of cross section as illustrated in Fig. 10. These ends constitute the fork between which material flows for forming the slot member in conjunction with the slide 52. The circular outer surface determines the diameter of the hollow interior of the spool.

The protrusions 64 and 65 are for the purpose of engaging within cooperating openings in the key slot forming member 49. That results in interlocking these elements and in supporting the otherwise free ends of the fork. The fork is prevented from spreading when plastic is introduced under great pressure. Small slots 29, Fig. 2, are formed by the protrusions 64 and 65.

In Figs. 11, 11b, 12 and 13, the key slot forming pin is shown at 49 and has a section indicated by numeral 66 which determines the slots 28, Fig. 2. Then, adjacent that, the sections generally indicated by numeral 67 which is rectangular, extends to the tapered or angular end 68, and it is this portion 67 of the key slot forming pin which cooperates within the space between the forked members 62 and 63 to complete the hollow core of the spool. The angular end 68 corresponds to a similar angular part 69 of the fork 61, and each of these determines one end of the slot and reinforcing member above described.

Holes 70 and 71 lengthwise of the pin 49 are for receiving protrusions 64 and 65. The circular opening upon which the spool is centered is completed by four filler pieces, one of which is indicated by numeral 72. The protrusions 64, 65 enter holes 70, 71 and slide up between the filler pieces, see Figs. 12 and 13. The ends of filler pieces 72 bear against the top surface of forks 62 and 63.

The manner in which these elements determine the interior formation of the spool is illustrated in both Figs. 7 and 8. In Fig. 8, it can be seen that they form a core within the interior of the cavity 45, and as the plastic is injected, it must necessarily assume the form shown since the elements 49, 61, and the slide 52 leave no other space into which plastic material may flow. The design of these molding parts also makes it relatively easy for them to be withdrawn from the finished piece. The top inner surfaces of the forks 62 and 63 are undercut or recessed at 73 and, therefore, leave a thin space within which plastic material flows. It is those spaces which are responsible for the fins or slide extensions 31 at the longer key slots 28.

It is not deemed necessary to describe or illustrate a mold for forming the flange 12 and its extending hub 13. That part can be molded very easily, and it is thought that after describing the manner in which the more difficult portion is molded, the process for forming the easier of the two elements should be quite apparent to those skilled in the art. Of course, it is molded so that any parting line will come at the periphery of the flange as it does with respect to the flange 11. It is merely necessary to employ axially separable and movable mold parts with one of which is associated a core for forming the hole. In the event both flanges are to be formed separately and later assembled to a core, the flange at the key slot end would necessarily be altered only in that its mold would provide for a key slot rather than the circular hole 30.

It will be noted that applicant's method of molding involves axially movable members all of which are concentrically disposed, and therefore, the main difficulties arising when molding by laterally movable parts is avoided. When employing laterally separable or movable mold parts, it is more difficult to maintain the opposing elements in alignment. Almost always they are not in perfect alignment, and accordingly, a parting line will be found at the opposite sides of the core and also at the inner faces of the flanges. Those parting lines are generally the result of the mold halves being offset, both to the side and lengthwise of the spool. In the event film without a backing or leader strip is wound on the core, the lack of a smooth surface causes marks on the film which carry through several layers. What is probably far more disastrous in the spooling operation is that the greater offsetting of the mold parts occurs in a lengthwise direction, and there a definitely stepped dividing line or offset is formed at the inner faces of the flanges. Thus those flange surfaces are not entirely within a single plane. That makes it practically impossible to exclude light at the edges of the film even though a leader strip or backing paper may be employed. Another difficulty arising therefrom is that in spooling the film and paper, the rapid rotation of the spool causes a chopping action at the edges of the film and paper which is caused by repeated contact of the parting line offset with those edges. That very frequently makes chips or dust particles which are imprisoned between the layers of film, or paper and film, and which may be responsible for an imperfection in the developed image. The importance of this can be realized when it is considered that the atmosphere within a film plant is always maintained dust-free by washing the circulating air and by other precautions taken with that point in view.

While specific forms of the invention and one particular device for carrying it into effect have been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. A photographic rollfilm spool including a unitary flange and hollow cylindrical core, a second and separate flange adapted to be attached to the hollow core in spaced relationship with the first flange, said core having internal reinforcing cross walls between which is a film slot, the inner surface of said flanges being dished outwardly between the core and the periphery of said flanges, and at least one ridge around the periphery of said flanges to form a light lock.

2. A spool for film or similar strip material comprising a hollow core having a flange at each end thereof, a reinforcing rib in said core extending across said core, the ends of said reinforcing rib being tapered, said reinforcing rib having a film slot extending therethrough, and means adjacent the ends of said reinforcing rib acting to light seal the ends of the core from said slot.

3. A molded spool for film or similar strip material comprising a hollow core having a flange at each end thereof, at least one of which is molded integrally with the core, and a reinforcing rib for said hollow core so constructed as to constitute a film slot and a light seal for preventing light entering through the spool ends from reaching the film adjacent the core.

4. A spool for film or similar strip material comprising a hollow core having a flange at each end thereof, a reinforcing rib in said core extending across said core, the ends of said reinforcing rib being tapered, said reinforcing rib having a film slot extending therethrough, and means comprising an integrally formed partition adjacent each end of the said reinforcing rib acting to light seal the slot from the ends of the core.

5. A molded, two-part roll film spool in which one part comprises a hollow core, an integral flange at one end thereof and a light tight film slot member serving as a reinforcement for the hollow core, and the other part comprises a flange and means for attaching it to the other end of the said core.

6. A molded photographic roll film spool having two sections, one of said sections consisting of a hollow cylindrical core and a circular flange at one end of the core, the second section consisting of a circular flange so constructed as to be attached to the opposite end of the core, and a reinforcing member formed as an integral portion of said hollow core and having a film slot therein, the wall thickness of the core, reinforcing member and flanges being substantially uniform.

7. A molded, two-part roll film spool in which one part comprises a hollow core, an integral flange at one end thereof and a film slot member serving as a reinforcement for the hollow core, and the other part comprises a flange and means for attaching it to the other end of the said core.

8. A molded, two-part roll film spool in which one part comprises a hollow core with an integral flange at one end, and the other part comprises a flange and means for attaching it to the other end of the core, the said flanges being dished at their inner faces and so spaced that at their peripheries the distance between them is slightly less than the width of the backing strip for the film to be wound on the spool, while at points intermediate the periphery and the core that distance is greater than the width of said strip, said flanges having concentric ridges adjacent their peripheries.

9. A molded roll film spool having in combination a hollow core with a reinforcing member therein, a film slot passing through said hollow core and reinforcing member, and flanges at the ends of the core, at least one of which is separately formed and provided with an extension by which it is attachable to the core.

10. A molded roll film spool having a hollow core with a reinforcing member therein, a film slot passing through said core and reinforcing member, flanges at the ends of the core, each of which is dished in such a manner that the distance between their inner faces adjacent the periphery of each flange is less than the width of the film backing strip to be wound on the core, but is greater at points nearer the core, and a series of concentric, stepped ridges at the inner face and adjacent the periphery of each flange.

11. A molded roll film spool having a hollow core, flanges at the ends of the core, each of which is dished in such a manner that the distance between their inner faces adjacent the periphery of each flange is less than the width of the film backing strip to be wound on the core, but is greater at points nearer the core, and a series of concentric, stepped ridges at the inner face and adjacent the periphery of each flange.

12. A molded roll film spool having in combination, a hollow core with a reinforcing member therein, a film slot passing through said hollow core and reinforcing member and having a light tight construction, including substantially parallel walls defining the ends of the slot, and flanges at the ends of the core, at least one of which is separately formed and provided with an extension by which it is attachable to the core.

13. A roll film spool having a core and flanges, one at either end of the core, said flanges being dished so that their inner faces are a lesser distance apart at the peripheries than at points closer to the core, and a series of stepped ridges at the inner face and adjacent the periphery of each flange.

14. A roll film spool having a core and flanges, one at either end of the core, said flanges being dished so that their inner faces are a lesser distance apart at the peripheries than at points closer to the core, and a plurality of substantially concentric ridges adjacent each flange periphery for engaging an outer layer of spooled material.

15. A roll film spool on which film is wound, said spool having a core and flanges, one at either end of the core, said flanges being dished so that their inner faces are spaced apart substantially the width of the film wound on said core at that portion of said flanges at the core, and at the peripheries, are spaced apart a distance slightly less than the width of said film, while at points intermediate the core and peripheries, the distance between inner faces of flanges is greater than the width of said film, said flanges having a plurality of film engaging, stepped ridges adjacent their peripheries.

16. A roll film spool on which film including backing paper is wound, said spool having a core and flanges, one at either end of the core, said flanges being dished so that their inner faces are spaced apart substantially the width of the backing paper wound on said core at that portion of said flanges at the core, and at the peripheries, are spaced apart a distance slightly less than the width of said backing paper, while at points intermediate the core and peripheries, the distance between inner faces of flanges is greater than the width of said backing paper, said flanges having a plurality of backing paper engaging, stepped ridges adjacent their peripheries.

17. A roll film spool of molded plastic material comprising an integral core and flange and a separately molded flange attached at the end of said core opposite the integrally formed flange, said flanges having inner faces which are molded into a dished form, said core and flange and attached flange being cast in axially separable mold parts thereby to prevent formation of flash lines at the core and inner faces of the flanges.

BRUNO C. ROEHRL.